United States Patent [19]

Deering

[11] Patent Number: 5,163,101
[45] Date of Patent: Nov. 10, 1992

[54] BITPLANE AREA CORRELATOR

[75] Inventor: Michael F. Deering, Mountain View, Calif.

[73] Assignee: Schlumberger Technologies, Inc., Palo Alto, Calif.

[21] Appl. No.: 412,619

[22] Filed: Sep. 26, 1989

Related U.S. Application Data

[63] Continuation of Ser. No. 122,578, Nov. 16, 1987, abandoned, which is a continuation of Ser. No. 785,353, Oct. 7, 1985, abandoned.

[51] Int. Cl.$^5$ ............................................... G06K 9/62
[52] U.S. Cl. .......................................... 382/32; 382/30
[58] Field of Search ........................ 382/30, 31, 32, 42, 382/46

[56] References Cited

U.S. PATENT DOCUMENTS

| | | | |
|---|---|---|---|
| 3,829,831 | 8/1974 | Yamamoto | 382/38 |
| 3,849,762 | 11/1974 | Fujimoto et al. | 382/34 |
| 4,032,885 | 6/1977 | Roth | 382/34 |
| 4,040,009 | 8/1977 | Kadota et al. | 382/38 |
| 4,110,737 | 8/1978 | Fahey | 382/23 |
| 4,119,946 | 10/1978 | Taylor | 382/34 |
| 4,200,861 | 4/1980 | Hubach et al. | 382/34 |
| 4,429,414 | 1/1984 | Asakawa | 382/30 |
| 4,486,775 | 12/1984 | Catlow | 382/34 |
| 4,547,800 | 10/1985 | Masaki | 382/30 |
| 4,550,437 | 10/1985 | Kobayashi | 382/41 |
| 4,623,923 | 11/1986 | Orbach | 382/34 |
| 4,635,292 | 1/1987 | Mori et al. | 382/49 |
| 4,641,350 | 2/1987 | Bunn | 382/34 |
| 4,644,584 | 2/1987 | Nagashima et al. | 382/34 |
| 4,651,341 | 3/1987 | Nakashima et al. | 382/34 |
| 4,736,437 | 4/1988 | Sacks et al. | 382/34 |
| 4,754,493 | 6/1988 | Coates | 382/30 |

OTHER PUBLICATIONS

TRW Model TPC1023J 64 Bit Digital Correlator Data Sheet, Jun. 1979, pp. 1–4, no author.

Primary Examiner—David K. Moore
Attorney, Agent, or Firm—Townsend and Townsend

[57] ABSTRACT

A method and apparatus for simultaneously correlating a mask to a series of shifted positions of an image. A series of bits from a field representing an image are supplied to a number of buffer registers. A number of overlapping combinations of bits from the buffer registers are simultaneously compared with the mask bits and a signal is produced indicating the results of such comparison for each of the image bit combinations. Algebraic functions are applied to the separate combinations to relate individual comparisons. A statistical analysis is performed to determine a best fit of an image to a mask.

14 Claims, 6 Drawing Sheets

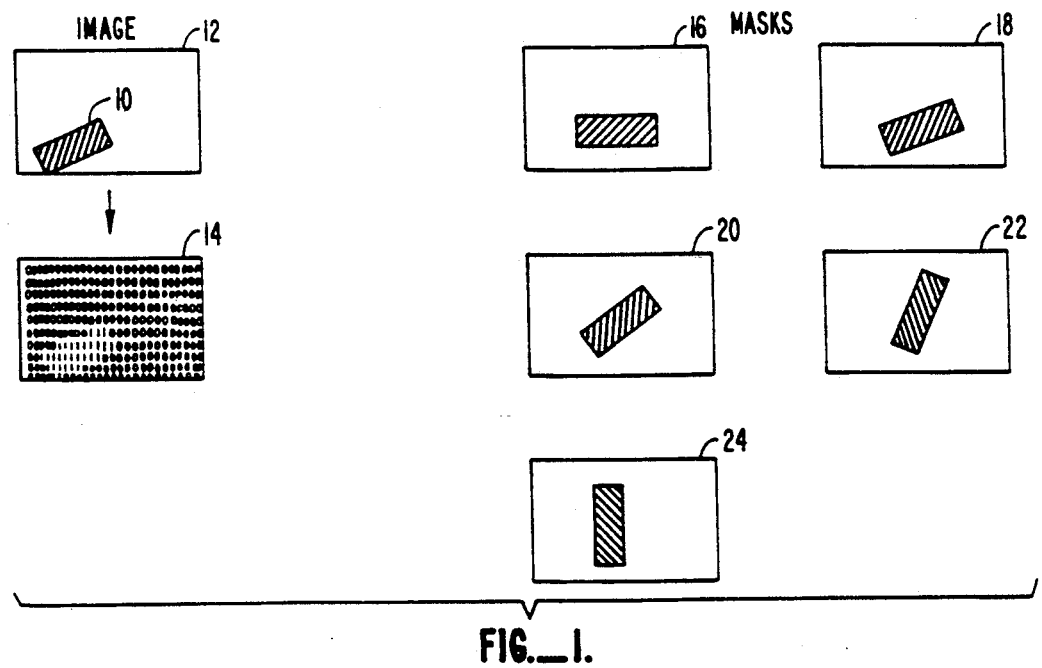
FIG._1.
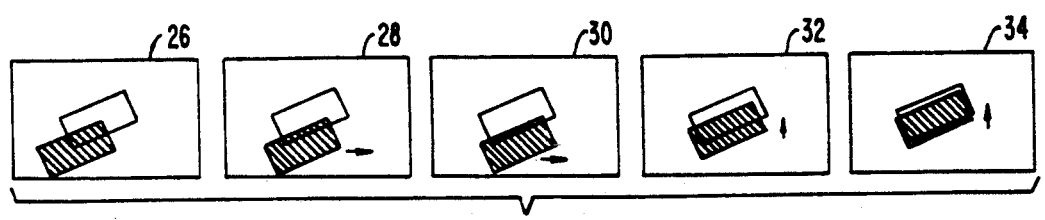
FIG._1A.
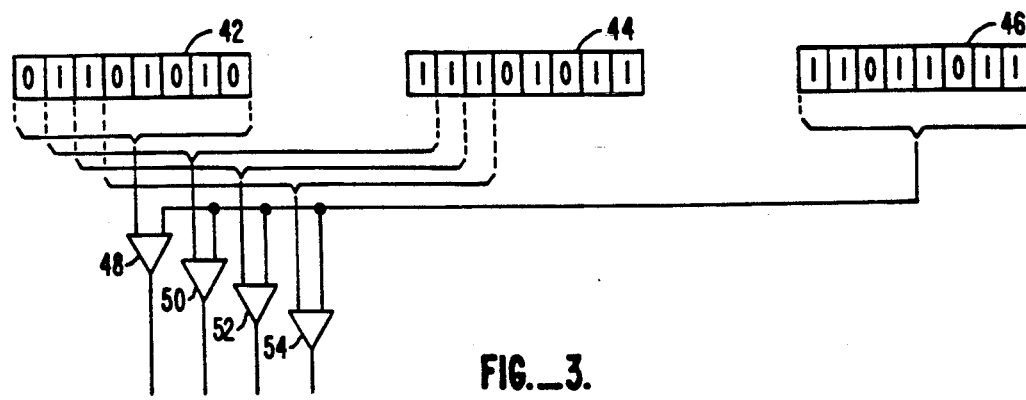
FIG._2.
FIG._3.

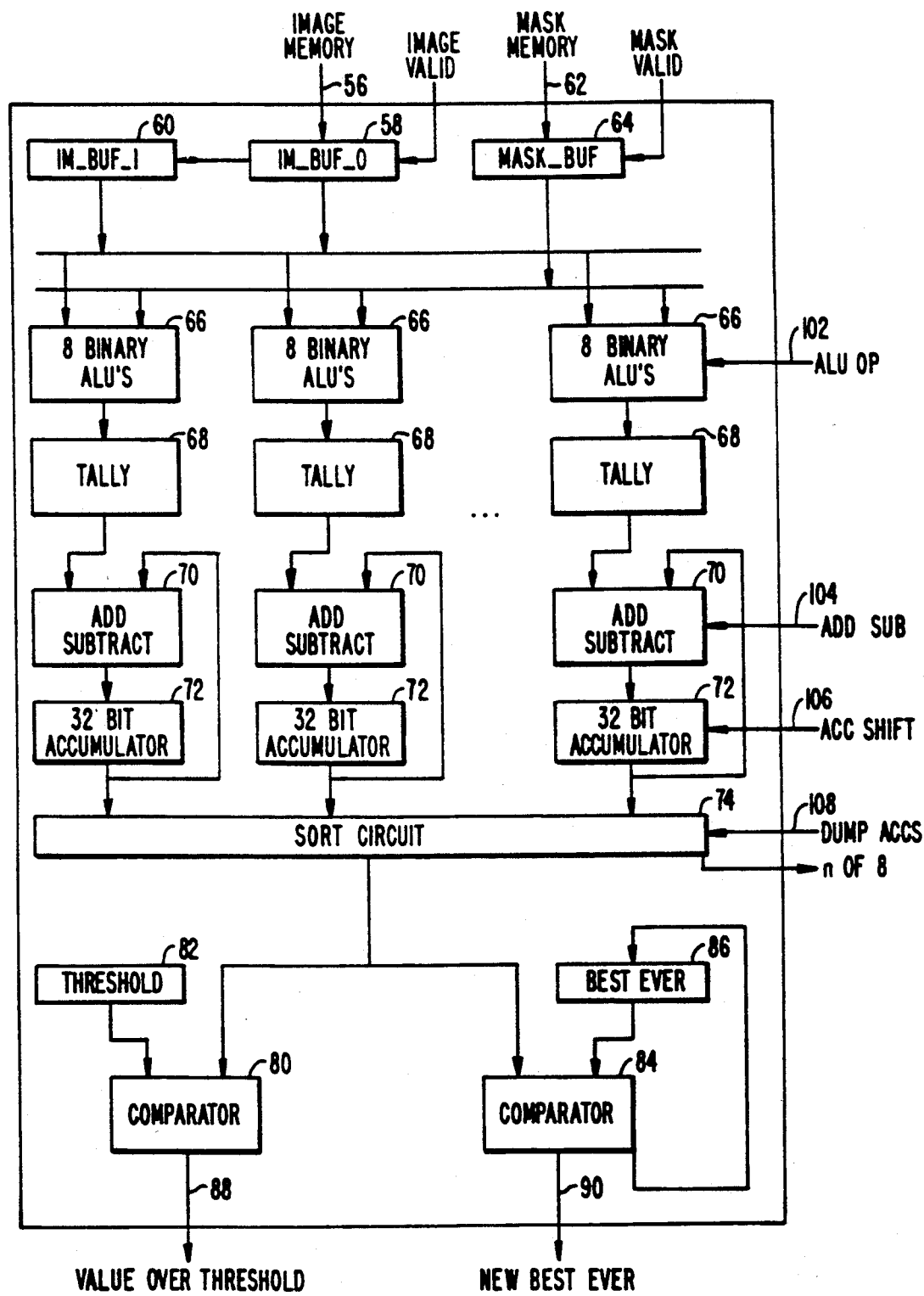
FIG._4.

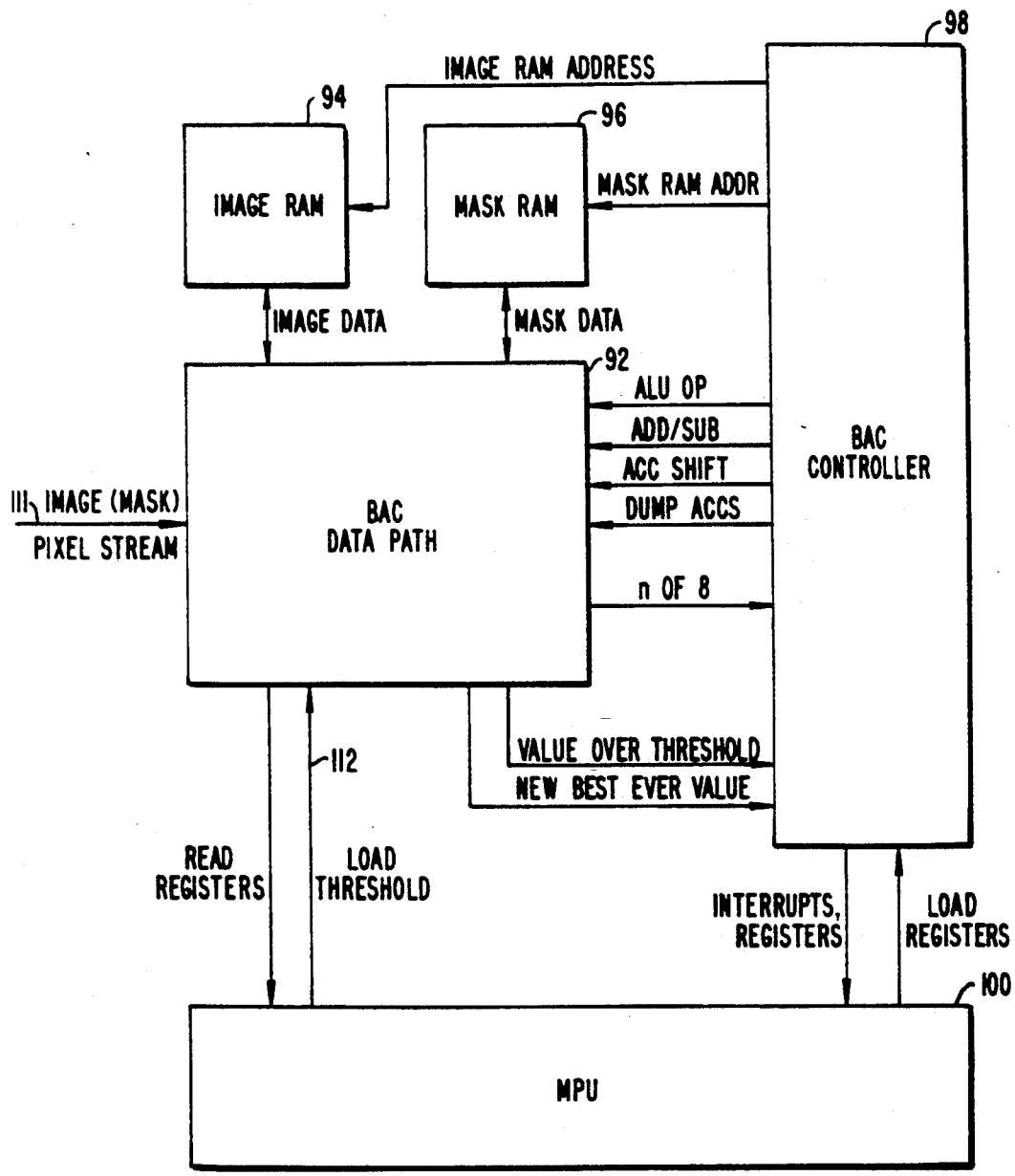
FIG._5.

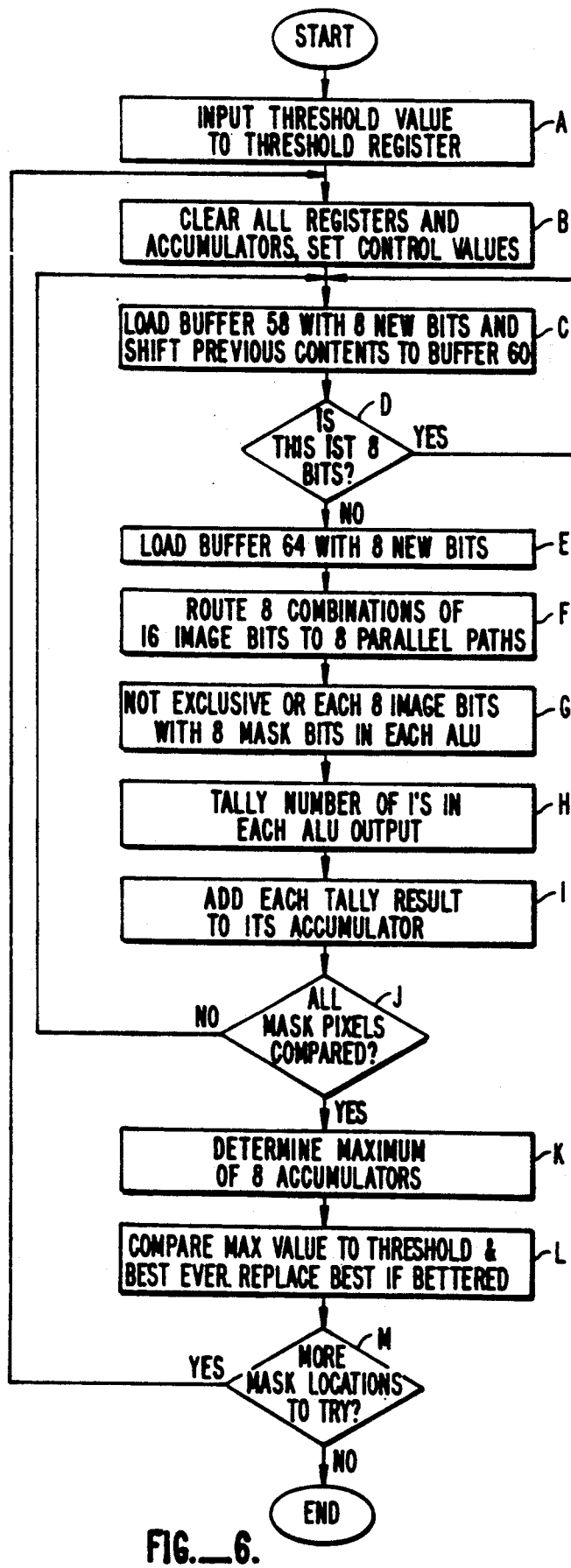
FIG._6.

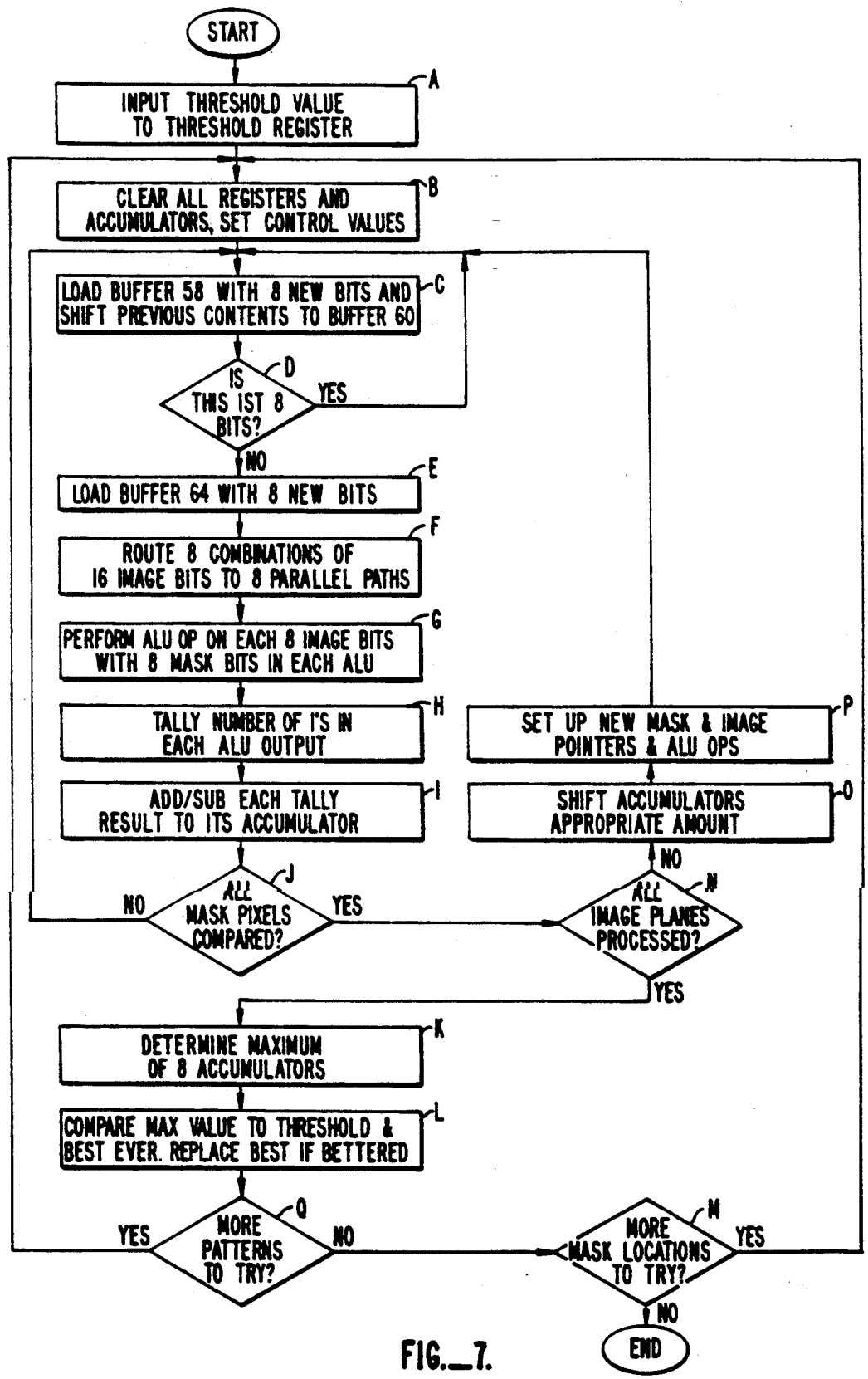
FIG._7.

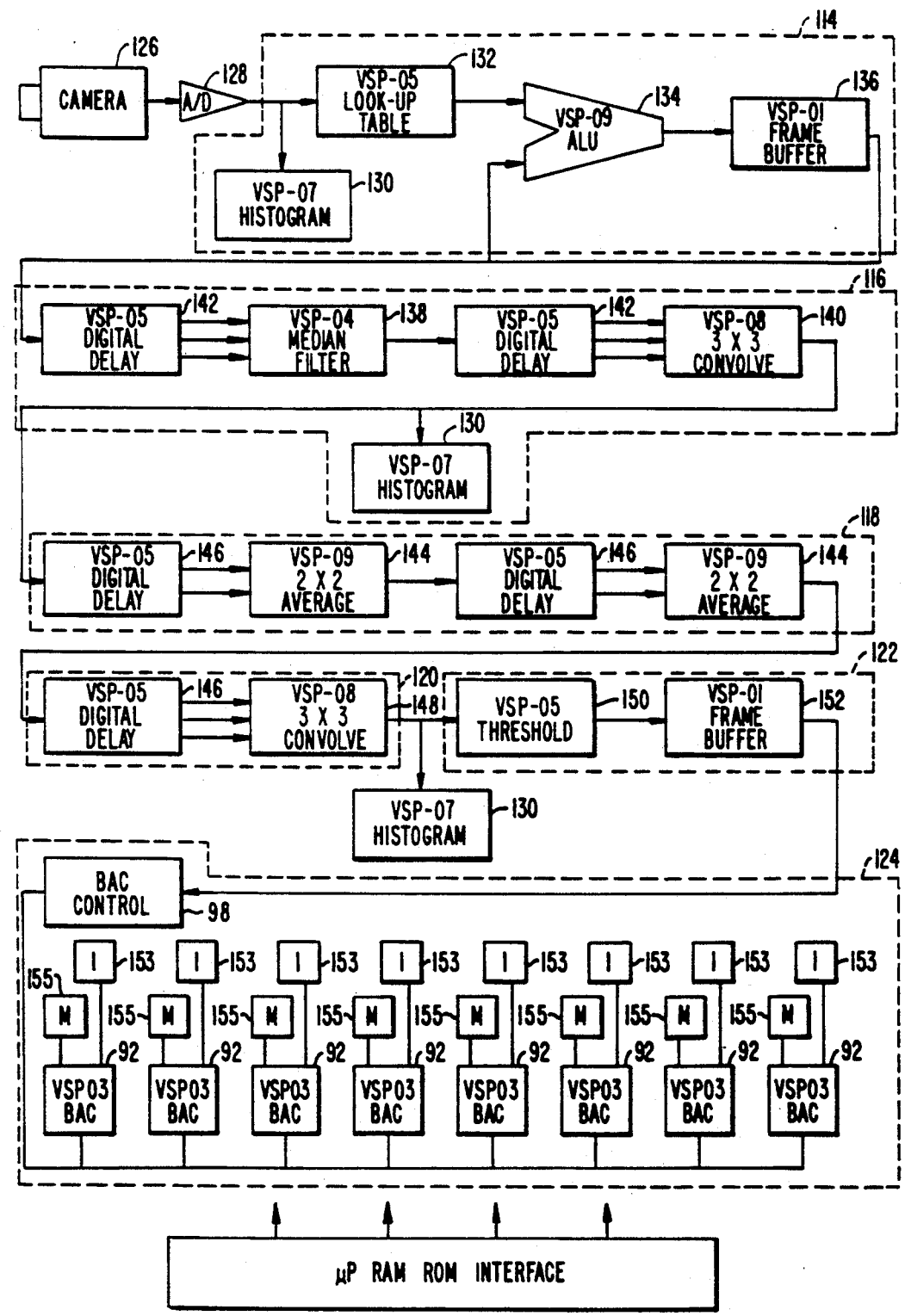
FIG._8.

BITPLANE AREA CORRELATOR

This is a continuation of application Ser. No. 07/122,578, filed Nov. 16, 1987 which is a continuation of application Ser. No. 785,353, filed Oct. 7, 1985, now abandoned.

BACKGROUND OF THE INVENTION

The present invention relates to correlators for use in visual signal processing.

Many image processing applications involve simply looking for the presence (or absence) of a known pattern and determining its location. Examples include locating parts on a conveyor belt, verifying the presence of parts during assembly operations, locating bonding pads and alignment marks on semiconductor chips, locating landmarks or targets in aerial imagery, and optical character recognition. Many video signal processing applications involve the computationally related process of convolving a two-dimensional signal array with a mask (e.g., to remove noise or enhance edges).

Both above classes of application require high-speed correlation (or matching) of a mask with an image. In addition, for the image processing examples, it is also necessary to determine the location with the best match. Traditionally, such functions have been implemented in special purpose boards using off-the-shelf components, resulting in large, expensive systems.

An example of how a correlation might be done is shown in FIGS. 1 and 1A. A rectangular image 10 in an image field 12 is captured by a video camera or other means, preprocessed to remove noise of other distortion or enhance edges, etc., and is then presented to a correlator. The image field 12 is represented as a series of binary digits as shown in field 14. Here the zeroes would represent a white background while the ones would represent the dark object.

In the correlation process, image 10 is compared with a series of masks 16, 18, 20, 22, and 24, which are stored in memory as an array of zeroes and ones. The masks have stored different orientations of an ideal image about one axis. The remaining two axes can be matched by moving the image horizontally and vertically, as shown in FIG. 1A. In FIG. 1A, image field 12 with image 10 is being matched against mask 20. As can be seen, the image is first shifted to the right as shown by fields 26, 28, and 30, and then is shifted upward until a best match is obtained. A simple way of determining a match is to compare each digital bit in image field 12 to each digital bit in mask 10 and produce a count of the number of bits which match. This count can then be compared with a threshold value which is chosen for a count which is close enough to indicate a match of the image with the mask. In one alternate method, a small portion of the ideal image could be stored as a mask (such as a 64×64 mask for a 128×128 image). Portions of the image can then be compared with the mask to determine where a match occurs.

Each line of the digital representation shown in field 14 is referred to as a scan line and the entire field 14 is referred to as a frame. The traditional method of shifting the image as shown in FIG. 1A is to input the digits of a scan line into a series of shift registers and shift the digits to the right sequentially and compare the digits to the mask at each shift position. Such a correlation method is shown in U.S. Pat. No. 4,200,861 to Hubach, et al. As can be seen, this requirement of shifting the bits of an image slows down the processing time due to the requirement for doing a comparison at each shift position.

The processing time required is further increased if one attempts to do gray scale matching. For gray scale matching, rather than each pixel of the image field 12 being either a digital zero or one, each pixel will be a binary number ranging, for instance, from zero to sixteen. Zero could represent white, with sixteen representing black, and the numbers in between representing different shades of grey. Each pixel is then represented by a four bit binary code as illustrated in FIG. 2. The correlation can then be done by comparing bits in a bit plane which consists of a corresponding bit in each of the pixels. The bit planes compared would be first the most significant bit in every pixel, with subsequent comparisons being made of the lesser significant bits. As can be seen, the number of shifts through a shift register required for a correlation is increased by severalfold, with a corresponding increase in processing time.

SUMMARY OF THE INVENTION

The present invention is a method and apparatus for simultaneously correlating a mask to a series of shifted positions of an image. A number of overlapping groups of bits from a field representing an image are simultaneously supplied to a number of buffer registers in a Bit plane Area Correlator (BAC). Each overlapping group corresponds to a different shifted position of a portion of an image. Each of the image buffers' contents are simultaneously compared with the mask bits and a signal is produced indicating the results of such comparison for each of the image bit combinations.

Preferably, the results of such comparison are stored separately for each overlapping group, or combination. Subsequent groups of bits are then compared in sequence until the entire image has been compared. The results of the comparison are added separately for each combination, with each combination representing a different horizontal and vertical shift of the mask with respect to the image.

After the entire image has been processed, the combination with the best correlation to the mask is selected. This combination is then compared to a threshold value to determine whether there is a match of the image with the mask.

The correlation results for a combination which exceeds the threshold are stored and are compared to correlation results for a subsequent mask whose results exceed the threshold. For each subsequent mask compared, only the best fit is retained in memory. Thus, after a number of combinations have been compared, the memory will contain only the best match of an image at a particular horizontally or vertically shifted position with a particular mask.

The above BAC functions can be implemented on a single correlator semiconductor chip along with a separate controller. These devices could be one part of a Visual Signal Processing (VSP) system which could include a large number of BAC chips along with other circuits for processing the image. Typically, the image will be processed before being supplied to the BAC to remove noise, etc.

In the preferred embodiment, two eight-bit image buffers are used, and eight shifted combinations of the digits in such buffers are fed to eight binary arithmetic logic units (ALUs). A mask buffer having eight bits is also fed as another input to each of the eight binary ALUs. After an appropriate ALU function, such as exclusive OR, the results of the function are fed into a separate tally unit for each of the eight parallel paths. Each tally unit counts the number of 1 bits in the resultant word from the ALU. Each tally result is then added to a separate 32-bit accumulator for each of the eight paths.

After an image is processed, the greatest value of the eight paths is selected and is simultaneously compared in two comparators to a threshold value for the image and a best ever match value. Outputs of the value over the threshold and a new best ever match are then provided. In addition to the addition function, a tally can be subtracted from the accumulator as well. This enables the system to not only determine whether a desired image is present, but also to determine whether an undesired portion of an image is not present.

The use of parallel processing rather than the use of a shift register as in the prior art enables a tremendous increase in speed to be achieved, thus allowing real time video processing. In addition, the use of a universal ALU with an accumulator provides tremendous flexibility of operations. For instance, rather than a simple exclusive OR function as a method of correlating, the system can be programmed to use comparison by multiplication, the absolute value of a difference, etc.

The present invention significantly increases the rate at which correlations can be preformed for a given pin or chip bandwidth (number of bits that can be input or output per second). A limiting factor for many correlators is the speed at which bits representing pixels can be input to the correlator, and the speed at which processed data can be output to an external computer for analysis. By inputting each group of eight bits only once, the speed of parallel processing can be taken advantage of without creating an input bottleneck.

Because the increased speed of the invention would also be unavailable if there were an output bottleneck, the correlator limits the number of output signals. This is done by including the summation and statistical analysis functions on the chip as discussed above. Only pixels which exceed some threshold force output activity.

The BAC does not generate a stream output, but rather condenses all its output down into a minimal form which the control microprocessor can process easily. Thus this component serves as an interface between the low level functions performed on huge amounts of data, in parallel, by the VSP hardware, and the higher level functions performed by the microprocessor, on condensed data.

The invention has the advantage that a number of BACs may be stacked, so that an arbitrary performance level may be achieved as an almost linear function of the number of correlator components used, up to the performance limits of the rest of the Visual Signal Processing (VSP) Circuit.

The BAC is highly programmable. It can perform a variety of functions, from arbitrary precision numerical correlation, to correlation of binary valued functions; it can handle special correlation allowing variable weighting of regions of the correlation patch, for example assigning some arbitrary region a weight of zero, as a "don't care" region.

BRIEF DESCRIPTION OF THE DRAWINGS

FIG. 1 shows a diagram of an image and various masks;

FIG. 1A shows various positions of the image of FIG. 1 over a mask of FIG. 1;

FIG. 2 illustrates bit planes for a number of pixels;

FIG. 3 is a schematic illustration of the principle of the present invention;

FIG. 4 is a schematic diagram of a preferred embodiment of the present invention;

FIG. 5 is a schematic diagram of the embodiment of FIG. 4 incorporated in a correlator system;

FIG. 6 is a flow chart of a simple sample operation for the embodiment of FIG. 4;

FIG. 7 is a generalized flow chart of operations for the embodiment of FIG. 4; and FIG. 8 is a block diagram of a VSP system incorporating the embodiment of FIG. 4.

DETAILED DESCRIPTION OF THE PREFERRED EMBODIMENT

FIG. 3 is a schematic diagram illustrating the principle of the present invention. Two image buffers 42 and 44 are shown, each being loaded with eight bits. A mask buffer 46 is loaded with eight bits from the mask. A search is done for an 8-bit string within the 16-bit field of buffers 42 and 44 which provides the closest fit to the mask bits. In the prior art, the contents of mask buffer 46 would be compared with the contents of a single image buffer 42. The contents of image buffer 42 would then be shifted eight times with a different bit being loaded into one end for each of the eight shifts.

In the present invention, the eight bits of buffer 42 are fed into an eight-bit comparator 42 and compared with the contents of mask buffer 46. Simultaneously, the last seven bits from buffer 42 and the first bit of buffer 44 are fed to a second comparator 50 and compared with the contents of mask buffer 46. Again, simultaneously the last six bits from buffer 42 and the first two bits from buffer 44 are fed to a comparator 52 and compared with the contents of mask buffer 46. Again, the last five bits of buffer 42 and the first three bits of buffer 44 are fed to a comparator 54. The combinations continue up to a last combination which compares all of the bits of buffer 44 with the bits of mask buffer 46. Thus, a comparison operation that required eight steps in the prior art is done in a single step in the present invention.

FIG. 4 is a schematic diagram of a preferred embodiment of the present invention. The circuitry implementing the functions of FIG. 4 can be incorporated on a single semiconductor chip. By using a sufficient number of identical chips, an entire image can be processed simultaneously in real time using traditional correlation techniques. More complex functions can also be performed in real time with a sufficient number of chips due to the ability of the chips to be cascaded. An image memory bus 56 provides 8 bits to an 8-bit image buffer 58. The contents of image buffer 58 can be shifted into a second 8-bit image buffer 60 upon an appropriate control signal. A mask memory bus 62 provides eight bits from the mask memory to a mask buffer 64. The mask and image busses could be the same physical bus, with data being sequentially supplied to buffers 58, 64.

The contents of buffers 58 and 60 are then fed to eight identical binary ALUs 66 in the manner set forth in FIG. 3. The contents of mask buffer 64 are also supplied to each of the binary ALUs 66. The output of each binary ALU is provided to a tally circuit 68. The output of each tally circuit 68 is supplied to an add/subtract circuit 70. The output of each add/subtract circuit 70 is supplied to a 32-bit accumulator 72.

The outputs of each of the accumulators 72 is supplied to a sort circuit 74 which determines the greatest value among the eight accumulators 72 and stores this result in a register 76. The identity of the particular accumulator 72 which had the greatest value (n of 8) is supplied to a 3-bit register in an external controller. The value in register 76 is compared in a comparator 80 to a threshold value in a register 82. In addition, the value from register 76 is compared in a comparator 84 to a best ever value in a register 86. Comparator 80 provides a value over threshold output 88 and comparator 84 provides a new best ever value output 90.

The implementation of the correlator chip diagram in FIG. 4 in a correlator system is shown in FIG. 5. A binary area correlator (BAC) 92 has the circuitry of FIG. 4. Image data is stored in an image RAM 94 and mask data is stored in a mask RAM 96. A bit plane area correlator (BAC) controller 98 controls the operation of BAC 92 and is itself controlled by a microprocessor 100. BAC controller 98 could be a microcode controller such as the AMD 29116 or a custom VLSI device.

The simplest operation which the correlator system performs is the comparison of a small binary test image (the mask) with another binary image. The mask is conceptually "laid over" the image, and the number of positions where the bit values in the mask match the bit values in the image are counted. When this number approaches the number of bits in the mask, a good match has been found. If this correlation operation is performed for every possible location of the mask over the image, then the result is an array of numbers representing the values of the match at each alignment.

Counting the number of bits which match is equivalent to performing a logical Not Exclusive OR operation between each pair of bits, and counting the number of "1" results. Other logical operations are possible: for instance, performing an exclusive OR operation counts the number of bits which do not match, while an AND operation counts the number of "1s" in the mask which match the "1s" in the image. The BAC is programmable for any of the possible sixteen logical operations between two pairs of bits.

If two separate binary masks are used, one pass of the correlator could count the number of "1s" which correspond between one mask and the image, while a second pass of the correlator could count the number of "0s" which correspond between the other mask and the image. The combined count provides a measure of the goodness of the match which may ignore some areas which are covered by the mask area. This allows masks to be programmed with "don't care" regions. (Such a "don't care" region might apply to the varying positions of the jaws of a crescent wrench which is being searched for.) By extension of this technique, sets of masks may be developed which apply varying "weights" to certain regions of the mask area.

The correlator can perform complex operations through a nesting of outer and inner loops. An outer loop is performed for a particular x, y offset of the image. The boolean operation to be performed by ALU's 66 is set. Add/Subtract circuits 70 are selected to do either addition or subtraction. The mask to be used is specified and the portion of an image to be compared is selected.

An inner loop is then run in which all the pixels of the portion of the image selected are compared to the selected mask in accordance with the functions selected in the outer loop. At the end of the loop, there is the option to shift the accumulator contents. Depending upon the program, several additional inner loops may be run with different function selections and the results added into the accumulators. The accumulator contents can then be compared and dumped, with the program then moving to the next x, y offset. For example, the accumulator might have the results of a 1's mask comparison to be added to the results of a 0's mask comparison. Or the results for the different powers of 2 in a grey scale match could be added in the accumulators with appropriate shifting to give the proper weights.

In some cases, it may be preferable to work in grey scale image space, rather than using binary images. In this case it is possible to build up a correlation result which is the sum of the products of the pixel values in corresponding positions in the mask and image by performing the multiplications bit by bit (binary long multiplication). This multiplication produces the largest overall values when the image and mask match. This allows the correlator to compute the convolution of a mask with an image, which may be used for certain pattern matching techniques.

A variation on this technique is to perform correlation between a binary image and a grey scale mask, or between a grey scale image and a binary mask. The BAC incorporates programmability to allow multiplication routines to be built up with any required precision of numbers of bits of image and mask planes independently.

The BAC contains 32 bit accumulators 72 in which the correlation results are computed for each mask image alignment. Eight such alignments are computed in parallel before the BAC continues with the next set of eight. A bit plane of an image is a binary image constructed from a single bit from each pixel in the original image. A correlator program specifies one or many steps in which a mask bit plane and an image bit plane are specified, together with a logical operation to apply between corresponding bit pairs. The resulting bits are counted, and the counts may either be added into or subtracted from the accumulators 72, or some other function may be performed. At the start of each program step, the previous value in the accumulators 72 may be shifted left by 0, 1 or more places to increase the significance of the preceding results. Finally, at the end of the program sequence the BAC examines the eight new values which it has just computed, reports any good matches above the preset threshold, saves the highest match value of the entire image so far, and clears the accumulators 72 back to 0. It then continues by applying the same program to the next set of eight mask/image alignments, until the entire image has been covered. The BAC system operates in two phases per frame cycle. First the mask and image data is read into two areas of static memory 94 and 96 and stored (phase 1). In the second phase, the BAC address generation system accesses the mask and image memory to bring the required bytes into the BAC data path in the correct order (phase 2).

Both the mask and image data must be bitpacked. Each bit plane is packed separately, so that the bits from eight adjacent pixels on one row form the bits of one byte. This operation may be performed by a separate bit-packing circuit (not shown). If multiple bit planes are to be packed, the bitpacker will interleave packed bytes from successive bit planes, and the correlator will address the memory in rotation to store them in separate areas of memory.

In general, the mask data will be loaded once for several frames. This may be done via the microprocessor interface, if the processor has access to the mask data (for example, if it is precomputed and stored), or, alternatively, it may be loaded through the VSP pixel bus, if the mask data has originated from earlier VSP processing stages.

There are three modes of operation:

1. In the simplest mode, a complete frame is loaded at once into the image memory. The correlator system then performs phase 2 in a single pass.

2. If the image memory is not large enough to hold all the image data in the required number of bit planes, then phases 1 and 2 are interleaved. A few lines of the image are read and stored, the correlator operates upon those lines, a few more lines are read, and those are operated upon also, and so on. Here the pixel source is being halted between each group of lines being accepted by the correlator.

3. Another possibility is to use multiple correlators, each operating on a portion of the image in parallel. In this case, each correlator is programmed to grab a subrange of the image lines and store them. The pixel source will stream the entire image without pause, and each correlator will load that portion which it has been programmed to accept. (There must be some overlap of the portions so that the mask can be applied in each possible location).

Multiple correlators may be applied in parallel by subdivision of the masks. If the image is to be correlated by several different masks, say of differing orientations or sizes of patterns, then each correlator can match the image against a different mask in parallel.

Referring back to FIG. 4, the operation of the correlator will now be described. Reference is made to the flowchart of FIG. 6, which gives the steps in a simple example of a correlation program. First, microprocessor 100 inputs a threshold value to register 82 (Step A). All other registers and the accumulators are cleared, the boolean function for ALU's 66 is selected, the Add-/Subtract control 104 is set and the mask and image portions to be matched are selected (Step B). The initial two bytes are transferred from the image memory 94 into registers 58 and 60 (Steps C and D). On subsequent loadings, only a single byte is loaded into register 60 with the byte already in register 60 being shifted into register 58. This enables the sequencing through the bytes of an image as illustrated in FIG. 3. Eight mask bits are loaded into buffer 64 (Step E). Controller 100 provides image valid and mask valid signals to buffers 58, 60, and 64. The image value and mask valid signals enable the data on input lines 56 and 62 to be input into the respective buffers. Separate valid signals are used to allow the extra image byte to be input. The mask valid input can also be used to enable accumulators 72 after a required delay to ensure that only results from valid pairs of masks and images are added into or subtracted from the accumulators.

The sixteen bits of image data and the eight bits of mask data are routed to eight 8-bit universal boolean ALUs 66 (Step F). The eight pairs represent successive offsets of the mask data against the image data. The boolean function to be performed is determined by the four-bit ALU function control signal 102. A simple example would be to perform a Not Exclusive OR function (Step G).

One clock cycle after the data buffers 58, 60 have a new set of valid data, each boolean ALUs 66 will present an output corresponding to the boolean function applied to the pair of eight-bit inputs.

Eight tally circuits 68 then accept the eight bits from the ALU's and produce a four-bit result which is a count of the number of "1" value bits in each tally input (Step H).

On each cycle, the four-bit tally result is added to (or subtracted from) the existing 32-bit value through add-/subtract circuitry 70 and the result is latched back into the accumulator at the end of the cycle (Step I). The 32-bit values contained in accumulator 72 represent signed, two's complement numbers. The add/subtract ALU function is determined by an add/subtract control input 104 from BAC controller 98 of FIG. 5.

An accumulator shift control signal 106 from BAC controller 98 can shift the accumulator value left or right to alter the relative significance of the results. When control signal 106 is asserted for a left shift, each accumulator will shift left on each clock tick, with zeroes being clocked in to fill the least significant bits. The combination of the shift and add/subtract capabilities enables a number of functions to be performed, including multiplication.

A control signal 108 signals sort circuit 74 to start a statistics operation. Unlike the preceding stages, the statistic operation does not occur on every clock cycle. The statistics operation might occur, for example, only after all the pixels of an image and a particular mask have been compared (Step J), or after several masks have been compared. Using the value of the eight accumulators from the previous cycle, a sort is performed to determine which has the maximum two's complement value (even if some or all are negative) (Step K). This value is preserved in a best-of-eight register 76 and its position (n out of eight) is supplied to BAC controller 98. A control signal 108 is input to the eight accumulators to reset them to zero. This can be done either after a portion of an image has been processed or after the whole image has been processed (as in FIG. 6).

The value in greatest-of-eight register 76 is compared to a value in threshold register 82 (Step L). The threshold register value has been previously loaded by microprocessor 100. If the greatest-of-eight register value is greater than the threshold value, comparator 80 will indicate this on output line 88 to BAC controller 98. An interrupt signal could then be supplied to microprocessor 100 by BAC controller 98 to indicate that the microprocessor should interrogate the correlator to determine the values of this match and to determine the position where it occurred. Alternately, the controller 98 might only interrupt microprocessor 100 when a best ever match is obtained after processing all masks. Thus, controller 98 can serve to greatly reduce the number of required interrupts to microprocessor 100 due to the unique configuration of the BAC.

In parallel to the threshold comparison, the greatest-of-eight value from register 78 is also compared in comparator 84 to a best ever value in register 86. The initial value from register 76 is simply loaded into register 86. Thereafter, subsequent values from register 76 are compared to the value remaining in register 86 (Step L). If the value from register 76 is greater, it is then substituted for the previous value of register 86. When comparator 84 indicates that the new best ever value is obtained, a new best output signal 90 is provided to BAC controller 98. The new best ever value 91 is readable upon demand for the best ever register 86. When a new best ever value is loaded into register 86, the position of this value from the n of 8 signal can be loaded into an overall best position register (not shown) in BAC controller 98. Controller 98 is thus signaled that a new best position has been established and this information can then be provided to microprocessor 100 by controller 98.

The best position could, for example, correspond to a particular mask, with one sort being done for each mask. If another mask is to be compared, such as a mask corresponding to a different portion of the image, the process is repeated (Step M) and a new value can be compared to the previous best. Referring back to FIGS. 1 and 1A, in one example the best of 8 value gives the horizontal or vertical position with the best match (FIG. 1A) and the best ever value gives the mask for which the best fit of this best horizontal or vertical shift is obtained.

FIG. 7 shows a generalized version of the flow chart of FIG. 6. Steps A–M are the same as for FIG. 6, except that in Step G any ALU operation may be performed an in Step I the tally result may be either added to or subtracted from the accumulator value. In addition, more than one image plane may be compared (Step N), such as for a grey scale comparison or where more than one image is being compared. The accumulators would then be shifted to give an appropriate weight to the particular bit plane to be processed (Step O). The designated ALU operation can be altered and the mask and image pointers are set to the appropriate bit plane (Step P). Instead of simply comparing one mask to a particular portion of an image as in FIG. 6, it may also be desirable to compare more than one mask pattern to a particular portion of an image (Step Q).

Referring now to FIG. 5, the system shown has a standard visual signal processing (VSP) eight-bit microprocessor data bus interface 111 which is channeled through BAC 92 and then supplied to Image RAM 94 and Mask RAM 96. BAC 92 thus acts like a frame buffer and eliminates the need for an external multiplexer. The microprocessor 100 can load the value of the threshold register along bus 112, which could be the same as data bus 111. Microprocessor 100 can also read the outputs of an overall best register and associated position register in BAC controller 98 as well as best-of-eight register and associated position register.

The system shown in FIG. 5 can be configured and programmed in a number of different ways and can utilize a variety of correlation techniques. The section entitled "Description of Correlation Techniques" below describes a number of possible correlation techniques which could be used by the method and apparatus of the present invention.

An example of a total VSP system incorporating the present invention is shown in FIG. 8. The VSP system consists of several sections: an averaging frame buffer 114, a filtering section 116, an averaging down circuit 118, an edge detector 120 to convert to edge space, a threshold and binary bit packer 122, and finally an array of sixteen BAC's 124 for edge space pattern recognition.

The incoming pixels from a camera 126 are first converted to digital eight bit grey scale values by an A/D converter 128, and then streamed first by a histogram unit 130. An example of an exemplary histogram unit 130 is disclosed in copending application Ser. No. 785,352, now U.S. Pat. No. 4,742,551 which is hereby incorporated by reference. Based upon the image energy statistics gathered by histogram 118, a look-up table 132 will be loaded with the appropriate transformation function for the raw pixel data to stream through. (The look-up table is updated after each frame of image goes by.) After look-up table 132, the pixels stream through an ALU 136 and into a frame buffer 136. ALU 134 allows successive camera frames to be added together to improve the signal to noise ratio. An example of an exemplary ALU circuit 134 is disclosed in copending application Ser. No. 785,351, now U.S. Pat. No. 4,754,412 which is hereby incorporated by reference.

The output of averaging section 114 enters two filters: a medium filter 138; and a 3×3 convolver 140 programmed as an image smoothing filter. Note that both filters require a digital line delay 142 to operate. The pixel stream is histogrammed again for control feed-back purposes. The overall purpose of filter section 116 is to smooth and condition the image in preparation for the later stages of processing.

Next the averaged filtered image is passed through two average down circuits 144. Because these circuits can be disabled and placed into a pass through mode, this average down section can be programmed to reduce its input image by 1×1 (none), 2×2, or 4×4 (normal). The intention is to once again increase the signal to noise ratio, as well as make a smaller image for the upcoming search. (Note, for area operations, two digital line delays 146 are used in conjunction with the 2×2 average down).

The reduced image is converted into edge space by sending it through a convolver 148 programmed as an edge operator. (Many times several convolvers are placed in parallel to look for edges of different tuned directions in parallel, with their results summed into a common stream again.) Yet another histogram is taken to measure now the edge space energy. The image is converted into edges so as to divide out the effects of uneven illumination and minor surface details.

The edge space image is finally thresholded to binary pixels (all pixels have been 8 bit grey scale until now) by a look-up table & bit packer 150, and the binary pixels are packed eight per byte and sent on to a second frame buffer 152. This binary packing operation is needed to convert the image data into the form that the upcoming correlation section needs.

The final stage is the array of BACs 92 themselves. Correlator controller 98 will now sequence the input image out of frame buffer 152, multiplex it through the BAC chips 92 themselves, and into local static RAMs 153. Controller 98 then sequences image bits from static RAMs 153 and masks (patterns) from static RAMs 155 into the BACs 92 in parallel. The purpose of the correlation section is to match pre-stored pattern images with the incoming images. The results of these matches can be applied in many ways.

This final stage is the most complex and the most programmable. Depending upon how the applications programmer has programmed the BAC sequencer, the sixteen BACs can perform any number of complex recognition tasks. A simple example from the semiconductor industry might involve the matching of pre-stored images of portions of semiconductor die to the incoming image to provide final alignment for a wire bonding machine for die bonding. A more complex task may involve matching instances of good chips with the incoming images in an in-processes wafer inspection machine.

As will be understood by those familiar with the art, the present invention may be embodied in other specific forms without departing from the spirit or essential characteristics thereof. For example, an add or subtract circuit could replace the ALUs of FIG. 4 to give a more limited performance capability. In addition, different circuitry could be used to interpret the results of the output of such ALUs or adders or subtractors. Accordingly, the disclosure of the preferred embodiment of the invention is intended to be illustrative, but not limiting, of the scope of the invention which is set forth in the following claims.

What is claimed is:

1. A semiconductor chip for comparing an image formed by a plurality of pixels to a mask formed by a plurality of pixels, comprising:
   a first memory for storing a plurality of bits representing a contiguous plurality of said mask pixels;
   a second memory for storing a plurality of bits representing a contiguous plurality of said image pixels larger in number than said plurality of mask pixels;
   a plurality of input lines coupled to data inputs of said second memory;
   a plurality of means for comparing said mask pixel bits to a combination of said image pixel bits;
   first bus means for coupling said first memory to all of said means for comparing;
   second bus means for coupling each output of said second memory to a plurality of said means for comparing such that each portion of said image pixel bits representing a single pixel is coupled to a different position in each of a plurality of said means for comparing, whereby a different combination of said image pixel bits is provided to each of said means for comparing, such that simultaneous comparisons, without requiring additional inputs, are provided for different offsets of groups of pixels in said image;
   means for counting the number of digital ones or zeroes in a result of said comparison and producing a digital tally of said number for each said combination;
   means for accumulating said tallies separately for each said combination;
   means for algebraically combining a tally of a second mask comparison with said accumulated tally for said combination; and
   means for selecting from among said accumulated tallies for said combinations a best match of said image to said masks and providing said best match to an output line.

2. A semiconductor chip for comparing an image formed by a plurality of pixels to a mask formed by a plurality of pixels, comprising:
   a first memory for storing a plurality of bits representing a contiguous plurality of said mask pixels;
   a second memory for storing a plurality of bits representing a contiguous plurality of said image pixels larger in number than said plurality of mask pixels;
   a plurality of input lines coupled to data inputs of said second memory;
   a plurality of means for comparing said mask pixel bits to a combination of said image pixels bits;
   first bus means for coupling said first memory to all of said means for comparing;
   second bus means for coupling each output of said second memory to a plurality of said means for comparing such that each portion of said image pixel bits representing a single pixel is coupled to a different position in each of the plurality of said means for comparing, whereby a different combination of said image pixel bits is provided to each of said means for comparing, such that simultaneous comparisons, without requiring additional inputs, are provided for different offsets of groups of pixels in said image; and
   means for producing a signal indicating the results of said comparison for each said combination.

3. The apparatus of claim 2 wherein said means for producing a signal comprises means for counting the number of digital ones or zeros in said results of said comparison and producing a digital tally of said number for each said combination.

4. The apparatus of claim 2 further comprising:
   means for accumulating the results of said comparison separately for each said combination; and
   means for selecting from among said accumulated results for said combinations a best match of said image to said mask.

5. The apparatus of claim 4 further comprising means for algebraically combining the results of a second mask comparison for each said combination with said accumulated results for said combination.

6. The apparatus of claim 5 wherein said means for algebraically combining comprises an accumulator and an add/subtract circuit.

7. The apparatus of claim 4 further comprising means for shifting at least a portion of said accumulated results to alter the relative significance of the pixels corresponding to said portion of accumulated results.

8. The apparatus of claim 4 further comprising means for repeating said steps for a plurality of masks and means for determining a best match for said masks to said image from among said best match for each said combination.

9. The apparatus of claim 8 wherein all of said means are combined on a single semiconductor chip, and further comprising means for providing a first signal to a first output of said chip indicating a combination having said best match and means for providing a second signal to a second output of said chip indicating a value of said best match.

10. The apparatus of claim 2 wherein said means for comparing comprises means for performing a Not Exclusive OR function on each pair of bits from said image and said mask.

11. The apparatus of claim 2 wherein each said pixel is represented by at least two bits to give a grey scale and further comprising means for repeating said storing and comparing steps for a second bit of each of said pixels.

12. The apparatus of claim 2 wherein each said means for comparing comprises a boolean arithmetic logic unit.

13. The apparatus of claim 2 wherein said means for accumulating comprises a 32-bit accumulator and an add/subtract circuit.

14. The apparatus of claim 2 wherein each said first mentioned means for comparing comprises a plurality of second means for comparing a portion of said mask pixel bits representing a single pixel to a portion of said combination of image pixel bits representing a single pixel.

* * * * *